United States Patent [19]
Gold

[11] Patent Number: 5,509,711
[45] Date of Patent: Apr. 23, 1996

[54] INSTALLATION MOLDING FOR TRAPEZOIDAL AUTO WINDSHIELD

[76] Inventor: Peter Gold, 389 Peninsula Blvd., Hempstead, N.Y. 11550

[21] Appl. No.: 324,877

[22] Filed: Oct. 18, 1994

[51] Int. Cl.⁶ .............................. B62D 27/00; E06B 3/62
[52] U.S. Cl. ...................... 296/93; 296/201; 52/204.597; 52/208
[58] Field of Search .................. 296/93, 201; 49/490.1, 49/462; 52/204.591, 204.597, 208

[56] References Cited

U.S. PATENT DOCUMENTS

| | | | |
|---|---|---|---|
| 2,814,525 | 11/1957 | Thomas | 296/93 |
| 2,840,416 | 6/1958 | Woodward | 296/93 X |
| 3,815,303 | 6/1974 | Ziegler | 52/204.597 X |
| 3,945,161 | 3/1976 | Drury | 52/204.597 X |
| 4,259,823 | 4/1981 | Hellriegel | 52/204.597 |
| 4,266,383 | 5/1981 | Krueger et al. | 52/204.597 |
| 4,850,640 | 7/1989 | Gold | 296/201 |
| 5,311,711 | 5/1994 | Desir, Sr. | 296/93 X |

*Primary Examiner*—Joseph D. Pape

[57] ABSTRACT

A method of installing an auto windshield molding in place about the peripheral edge of the windshield in a trapezoidal windshield opening, during which the converging sides of the windshield opening, which provide the trapezoidal shape, also provide a camming-type function by compressing the molding length portions contacting these sides, the compression more particularly effectuating a shape change in the molding which enhances the firmness of its gripping engagement to the windshield peripheral edge.

1 Claim, 1 Drawing Sheet

INSTALLATION MOLDING FOR TRAPEZOIDAL AUTO WINDSHIELD

The present invention generally relates to a weather barrier seal for an auto windshield of a type typically extruded of rubber in a shape appropriate for engagement about the peripheral edge of the windshield and called in trade parlance a reveal molding, and more particularly to a molding shape which uses to advantage the geometric shape of the windshield opening to enhance its gripping engagement to the windshield.

EXAMPLES OF THE PRIOR ART

In my U.S. Pat. No. 4,850,640 issued for Auto Window Moulding on Jul. 25, 1989, incorporated herein in its entirety by this reference, there is disclosed a molding installed, as well understood, by insertion in a gap between a windshield already seated in a slightly oversized windshield opening. The molding of this patent is an insert type and the adhesion to urethane or similar sealant is relied upon to hold the molding in place.

Another variety of molding, known as a gripper, is described and illustrated in U.S. Pat. No. 5,311,711 issued to Julio Desir, Sr. for "J-Type Window Lace Assemblies" on May 17, 1994. As well understood, this type molding is first seated about the peripheral edge of the windshield, and said windshield and seated molding then positioned on a support leg of a flange bounding the windshield opening. Urethane deposited on the support leg and adjacent flange wall is relied upon to hold the molding-framed windshield in place.

It is known, however, that the rubber construction material of the molding is chemically inert and, thus, a firm adhesive attachment between the rubber and the urethane sealant or similar adhesive is difficult to achieve, and this is a shortcoming of a gripper molding because of its interposed position between the glass windshield and the metal flange.

It is an object of the present invention to provide a firmly auto windshield-engaged gripper molding overcoming the foregoing and other shortcomings of the prior art.

More particularly, it is an object to supplement the firmness by which the within molding engages the windshield using a camming-type function of the sides bounding the auto windshield opening to induce an urgency in the rubber construction material of the molding to achieve said gripping firmness, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

For the proper installation of an auto windshield, it is well understood that the front portion 10 (FIG. 3) of an auto typically has at the windshield location a depending flange 12 which bounds the windshield opening 14 and has a laterally extending leg 16 which supports the installed windshield from beneath.

Figure 1:
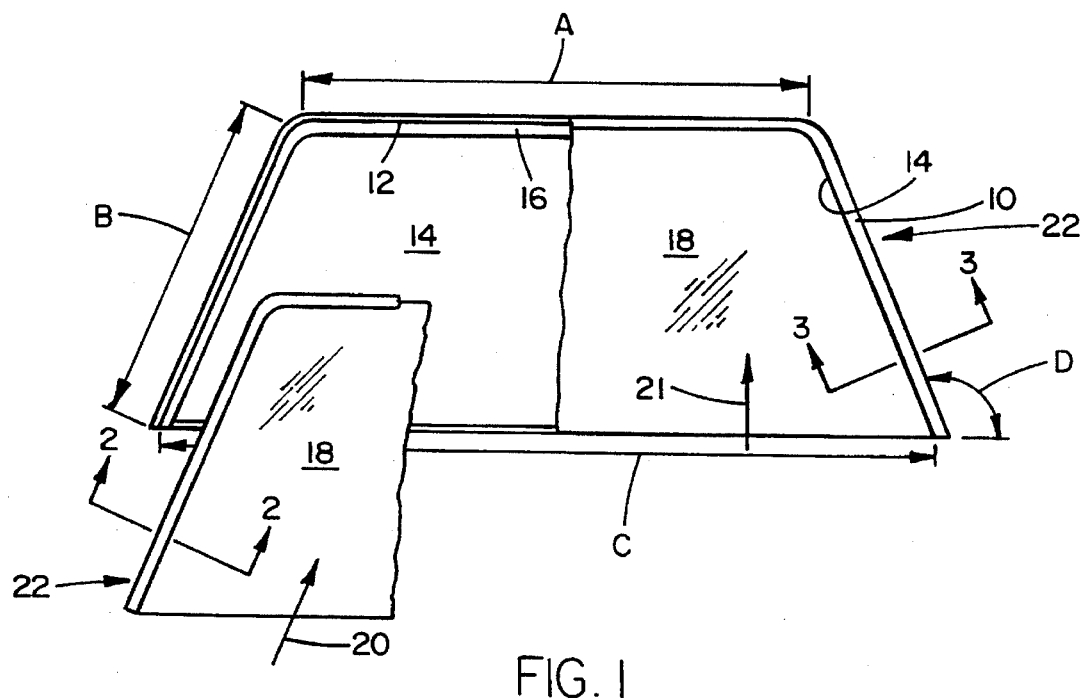
FIG. 1 is a front elevational view illustrating the positions of movement of the auto windshield during the installation thereof according to the present invention.

The windshield, designated 18 in FIG. 1, is of course sized to fit within the slightly oversized opening 14, being placed therein upon the support leg 16. In FIG. 1, to better explain the inventive advance, windshield 18 is partially illustrated at the left in an initial position of movement for installation movement 20 into the opening 14, and in the partial illustration at the right, is depicted in its fully installed position within the opening 14.

Underlying the present invention is the recognition that windshield opening 14 is typically of a trapezoidal shape and that the flange opposite sides 12 thus provide a "camming" function which can be advantageously used to induce an urgency in the extruded rubber molding 22 that is seated or engaged about the peripheral edge of windshield 18 to obviate inadvertent disengagement of the molding 22.

Figure 2:
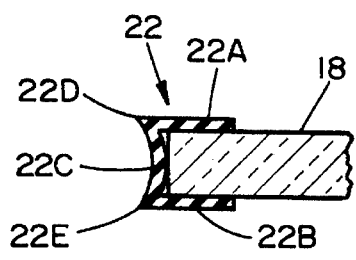
FIG. 2 is a sectional view, on an enlarged scale, as taken along line 2—2 of FIG. 1.
Figure 3:
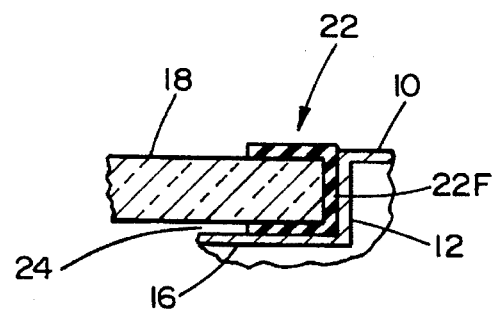
FIG. 3 is also an enlarged scale sectional view, but as taken along line 3—3 of FIG. 1.

More particularly, molding 22 in its shape as extruded and cut to length to fit about the windshield 18 includes, as best shown in FIG. 2, opposite inwardly extending legs 22A and 22B connected by a concavely shaped center leg 22C which at the intersection of the legs form rearward corner projections at 22D and 22E. Windshield 18 with molding 22 in place about its peripheral edge is manually urged from an initial position of movement 20 to a final position of movement within opening 14 so that along this movement path opposite angled sides of the windshield establish contact with the cooperating opposite sides of the opening 14 with, it is to be specifically noted, the side molding length portions in an interposed position along the contact being established. As a consequence, the opposite sides and top length portions of molding 22 have the concave shapes 22C modified, by the camming influence of the side flanges 12, into a flat configuration 22F as shown in FIG. 3. The flattening of center leg 22C also occurs along the flange 12 bounding the top of opening 14.

Stated somewhat differently, during installation along the movement path 20, 21 contact with the inclined flanges 12 which bound the sides of opening 14 urge the projections 22D and 22E inward of the windshield 18 and this not only correspondingly urges the legs 22A and 22B inwardly, but only urges these legs in closing movement towards each other which increases the grip of the molding 22 on the peripheral edge of the windshield 18.

In a practice well understood, to complete installation windshield 18 is supported by clips or otherwise engaged along its bottom edge to prevent inadvertent reverse direction movement 20 and urethane or similar adhesive sealant (not shown) optionally deposited on the support leg 16 in the clearance 24 to obviate "popping" of the windshield from the opening 14. Because of the enhanced grip of molding 22 on the windshield 18 as above described only a nominal amount of urethane is required, and only in the clearance 24, whereas in the prior art, an adhesive sealant of urethane or the like is typically used beneath the upper molding leg 22A, between the center molding leg 22C and flange 12, and beneath the lower molding leg 22B.

For completeness' sake it is noted that the within inventive method is advantageous for a 1992 Mazda, model 626, having a trapezoidal shaped windshield opening in which the size dimension A of opening upper edge is 45 inches, the size dimension B of the opening side edge is 26 inches, the size dimension of opening lower edge is 62 inches, and the angle D subtended at the lower corners is 110 degrees, it being understood that the identified 1992 Mazda is only exemplary of numerous other cars appropriate for practicing the within invention.

While the described structure for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended other than as defined in the appended claims.

What is claimed is:

1. A method of establishing an engagingly gripping relation of an elastomeric molding about the peripheral edge of an auto windshield during the installation thereof in a windshield opening of a type having edges cooperating to bound said opening in a specific trapezoidal shape consisting of a horizontally oriented upper edge and opposite angularly oriented side edges terminating in ends subtending similar selected obtuse angles, said ends of said side edges bounding in spanning relation therebetween an entrance opening into said trapezoidal shape of said windshield opening characterized by a progressive diminishment in size of said opening in a direction toward said upper edge of said trapezoidal shape as results from an angular orientation towards each other of said side edges, said windshield being of a type having upper and side edges cooperating to embody said windshield with a trapezoidal shape conforming to said trapezoidal shape of said windshield opening, said method comprising the steps of extruding said elastomeric molding having in cross section a C-shape defined by opposite spaced-apart side legs and connected in spanning relation between said side legs a center leg characterized by a concavely shaped configuration, cutting to size said molding preparatory to the positioning of a length portion thereof about said windshield upper and side edges, seating said sized molding upon said windshield with said upper and side edges thereof projected between said opposite side legs of said molding incident to establishing an initial gripping relation therebetween, inserting said windshield with said seated molding thereabout through said entrance opening into said trapezoidal shape, and urging said windshield with said seated molding thereabout in movement through said progressive diminishment in size of said trapezoidal shape so as to establish progressive engagement between said molding concavely shaped center leg and said angularly oriented opposite side edges until abutting contact is made by said windshield upper edge with said upper edge of said trapezoidal shape whereby sliding contact of said molding seated upon said windshield side edges against said window opening side edges flattens said concavely shaped configuration of said molding center leg to cause an urgency in said molding side legs contributing to providing said engagingly gripping relation therebetween.

* * * * *